(12) United States Patent
Pischow

(10) Patent No.: US 9,513,032 B2
(45) Date of Patent: Dec. 6, 2016

(54) METHOD FOR PRODUCING A DIRECT FLOW ALUMINIUM ABSORBER FOR A SOLAR THERMAL COLLECTOR

(75) Inventor: Kaj A Pischow, Mikkeli (FI)

(73) Assignee: SAVO-SOLAR OY, Mikkeli (FI)

(*) Notice: Subject to any disclaimer, the term of this patent is extended or adjusted under 35 U.S.C. 154(b) by 337 days.

(21) Appl. No.: 14/349,353

(22) PCT Filed: Oct. 11, 2011

(86) PCT No.: PCT/FI2011/050877
§ 371 (c)(1),
(2), (4) Date: Apr. 3, 2014

(87) PCT Pub. No.: WO2013/053979
PCT Pub. Date: Apr. 18, 2013

(65) Prior Publication Data
US 2014/0224243 A1  Aug. 14, 2014

(51) Int. Cl.
  F24J 2/26 (2006.01)
  F24J 2/48 (2006.01)
  B21D 53/08 (2006.01)
  F24J 2/46 (2006.01)

(52) U.S. Cl.
  CPC .......... *F24J 2/26* (2013.01); *B21D 53/08* (2013.01); *B23K 26/262* (2015.10); *F24J 2/265* (2013.01); *F24J 2/481* (2013.01); *F24J 2/485* (2013.01); *F24J 2002/4678* (2013.01); *Y02E 10/44* (2013.01); *Y10T 29/49364* (2015.01)

(58) Field of Classification Search
  CPC .............................. F24J 2002/4678
  USPC ......................................................... 126/674
  See application file for complete search history.

(56) References Cited

U.S. PATENT DOCUMENTS

| 4,267,218 A * | 5/1981 | Brugger ............... C25D 11/22 |
| | | 126/271.1 |
| 6,261,422 B1 * | 7/2001 | Mingazhev ........... C23C 14/0005 |
| | | 204/192.12 |
| 2005/0145680 A1 * | 7/2005 | Travassaros .......... F28D 1/0477 |
| | | 228/183 |
| 2007/0196670 A1 | 8/2007 | Barshilia et al. |
| 2008/0190414 A1 | 8/2008 | Link |

(Continued)

FOREIGN PATENT DOCUMENTS

| CN | 201449047 U | 5/2010 |
| JP | 1977-159607 | 6/1979 |

(Continued)

OTHER PUBLICATIONS

International Search Report, dated Jul. 5, 2012, from corresponding PCT application.

(Continued)

*Primary Examiner* — Avinash Savani
(74) *Attorney, Agent, or Firm* — Young & Thompson

(57) ABSTRACT

The application relates to a method (100) for producing a direct flow aluminium absorber of a solar thermal collector, the absorber including an absorber plate having at least one tube for a heat transport fluid, and at least one end tube for a heat transport fluid, the at least one end tube being connected to the absorber plate. The method comprises laser welding (130) the at least one end tube to the absorber plate for producing the complete absorber to be coated by at least one layer configured to absorb light.

18 Claims, 3 Drawing Sheets

(56) References Cited

U.S. PATENT DOCUMENTS

2009/0266105 A1* 10/2009 Viklund ............... B21D 53/085
                                                                               62/498
2010/0261011 A1    10/2010 Kuster et al.

FOREIGN PATENT DOCUMENTS

| JP | 58-224261 | 12/1983 |
|----|-----------|---------|
| JP | 1983-224261 A | 12/1983 |
| JP | 2001-152631 | 6/2001 |
| JP | 2004-317117 A | 11/2004 |
| WO | 2006031108 A2 | 3/2006 |

OTHER PUBLICATIONS

JP Office Action, dated Aug. 4, 2015; Application No. 2014-535129.
Japanese Office Action corresponding to JP patent application No. 2014-535129 dated Apr. 26, 2016. English translation provided.

* cited by examiner

METHOD FOR PRODUCING A DIRECT FLOW ALUMINIUM ABSORBER FOR A SOLAR THERMAL COLLECTOR

TECHNICAL FIELD

The application relates generally to a method for producing a direct flow aluminium absorber for a solar thermal collector.

BACKGROUND

Traditional manufacturing method of thermal absorbers of solar collectors starts with a roll-to-roll coating process, where flexible and thin substrate material such as copper or aluminium foil is transported continuously through vacuum deposition chambers, wherein it is coated in order to provide selective solar radiation absorbing layers on the substrate material.

After the roll-to-roll coating process, the coated aluminium or copper foil, which delivery form is a coil, is processed for obtaining a thermal absorber having a certain shape and size by opening the coil in order to get a suitable section for removing pieces from the coil, cutting the coated foil to desired foil pieces, and attaching those foil pieces together or with other parts of the thermal absorber such as a cooling fluid tubing. Alternatively, the coil is delivered to a subscriber who processes the coated aluminium or copper foil according to his own needs.

Even though the roll-to-roll process is quite fast, the whole manufacturing process from an uncoated foil to a coated thermal absorber is slow and complex because of several working stages and numerous transfers of uncoated or coated coils from place to another. Furthermore, the attaching process of the metallic foil to the water tubing, e.g. by flame brazing, is expensive, requires sophisticated technology, and connection areas of the thermal absorbers manufactured by such traditional method are prone to failure due to corrosion.

SUMMARY

One object of the invention is to withdraw the above-mentioned drawbacks and to provide a method for producing a full aluminium direct flow absorber that has an increased surface area of the absorber.

One object of the invention is fulfilled by providing a method of claim 1, a direct flow aluminium absorber of claim 6, and a solar thermal collector of claim 7.

According to an embodiment of the invention a method for producing a direct flow aluminium absorber of a solar thermal collector, the absorber comprising an absorber plate having at least one tube for a heat transport fluid, and at least one end tube for a heat transport fluid, the at least one end tube being connected to the absorber plate. The method comprises laser welding the at least one end tube to the absorber plate for producing the complete absorber to be coated by at least one layer configured to absorb light.

The term "direct flow absorber" refers to any absorber, where heat transport fluid, e.g. water or air, circulates inside a thermal absorber structure.

The term "laser welding" refers to a welding technique that is used to join multiple pieces of metal by means of a continuous and/or pulsed laser beam. The processing laser can be e.g. a solid state, gas, or fiber laser.

The term "complete absorber" refers to any absorber that comprises a rigid or flexible absorber plate and a heat transport fluid tubing, e.g. for water or air. The complete absorber means that the thermal absorber is completed and, when the absorber has been coated, it is ready to be installed into other structure of a solar thermal collector, i.e. there is no need to further process the coated absorber for obtaining a desired thermal absorber having a certain shape or size but to apply water connection parts if needed. The absorber plate can be formed by one piece or several pieces that are attached together e.g. by welding, soldering, riveting, gluing, screwing, or hot pressing. In addition, the rigid or semi-rigid absorber to be coated can comprise water channels realized by aluminium extrusion, metal rolling, and/or other methods to form a direct cooled absorber.

According to an embodiment of the invention a direct flow aluminium absorber for a solar thermal collector that absorber comprises an absorber plate having at least one tube for a heat transport fluid, at least one end tube for a heat transport fluid. The at least one end tube being connected to the absorber plate by laser welding for producing the complete absorber to be coated by at least one layer being configured to absorb light.

According to an embodiment of the invention a solar thermal collector comprising a direct flow aluminium absorber comprising an absorber plate having at least one tube for a heat transport fluid, and at least one end tube for a heat transport fluid. The at least one end tube being connected to the absorber plate by laser welding for producing the complete absorber to be coated by at least one layer being configured to absorb light.

Further embodiments of the invention are defined in dependent claims.

The method according to embodiments of the invention simplifies the manufacturing process since it is not necessary to mechanically clean the absorber after an absorber plate and end tubes have been attached to each other by laser welding. When using e.g. flame brazing to this attachment, there is always a need to clean remains of a used flux afterwards, whereupon a risk of mechanical damages, manufacturing costs, and a health risk of a processing staff because of used methods and chemicals increase.

The method according to embodiments of the invention provides visually tidy joints between the absorber plate and the end tubes that are planar and narrow when comparing with robust, large, and dirty flame and furnace brazing joints.

The method according to embodiments of the invention increases efficiently a surface area of the absorber because of the extremely narrow joint area. When using the flame or furnace brazing, the large joints that are 20-30 mm width decrease the surface area and, thus, an emissivity of the absorber.

The method according to embodiments of the invention decreases a distortion of the finished complete absorber because of lower welding temperature, whereupon produced absorbers have more uniform quality and the processing of the absorbers becomes easier.

The method according to embodiments of the invention provides a decreased material cost since the lower welding temperature causes less detrimental structural changes in the aluminium absorbers.

The verb "to comprise" is used in this document as an open limitation that neither excludes nor requires the existence of also unrecited features. The verbs "to include" and "to have/has" are defined as to comprise.

The terms "a", "an" and "at least one", as used herein, are defined as one or more than one and the term "plurality" is defined as two or more than two.

The term "another", as used herein, is defined as at least a second or more.

The term "or" is generally employed in its sense comprising "and/or" unless the content clearly dictates otherwise.

For the above-mentioned defined verbs and terms, these definitions shall be applied, unless a different definition is given in the claims or elsewhere in this description/specification.

Finally, the features recited in depending claims are mutually freely combinable unless otherwise explicitly stated.

BRIEF DESCRIPTION OF THE FIGURES

The exemplary embodiments of the invention will be described with reference to the accompanying figures, in which.

DETAILED DESCRIPTION OF THE FIGURES

Figure 1:
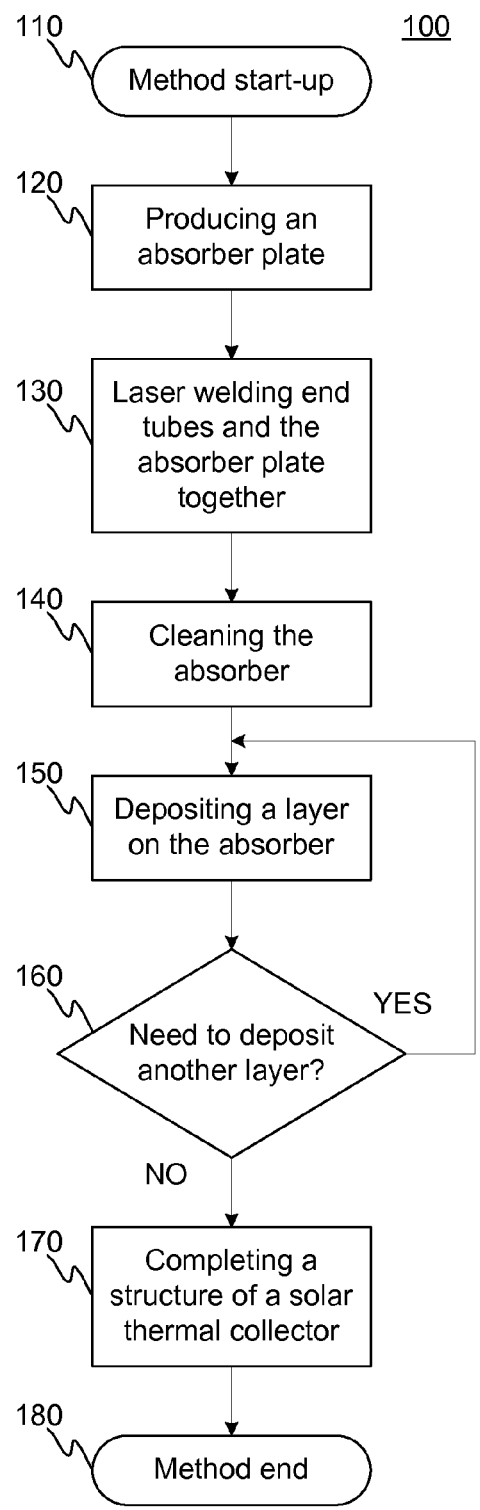
FIG. 1 illustrates a flowchart of a method for producing a solar thermal collector.

FIG. 1 illustrates a method 100 for producing a direct flow full aluminium absorber for a solar thermal collector. The produced absorber comprises an aluminium absorber plate including at least one integrated tube for a heat transport fluid, and end tubes (header tubes) for a heat transport fluid. The end tubes are connected to ends of the absorber plate and at least one of them can be used to connect the absorber, i.e. the solar thermal collector, to external heat transport fluid tubing.

During the method start-up in step 110, a rigid or semi-rigid aluminium piece, or several rigid or semi-rigid aluminium pieces, to be used as a raw material for producing the absorber plate is prepared by picking the piece(s) up from a package, checking that it is ok, and cleaning the piece(s) mechanically and/or chemically if necessary. In addition, it is possible to start a vacuum coating line to be used in a coating process and made necessary actions, e.g. checking and service operations, in order to provide that the vacuum coating line works as it should.

In step 120 the rigid or semi-rigid absorber plate is produced by forming from a single aluminium piece a desired final shape and size. Alternatively, the absorber plate is produced by attaching aluminium strips together, e.g. by laser welding, screwing, and/or hot pressing, such that the desired final shape and size are achieved. The aluminium piece(s) can comprise ready integrated heat transport tubes, i.e. water channels, inside the absorber plate, or the heat transport tubes can be equipped with such, e.g. by means of an aluminium extrusion, in order to obtain a direct flow absorber plate. After the absorber plate is finished it is possible to clean it mechanically and/or chemically again.

In step 130 the end tubes are laser welded to the finished absorber plate for producing the complete direct flow absorber structure. The end tubes are laser welded to the absorber plate so that the end tubes and the integrated heat transport tubes form a continuous heat transport channel in the absorber. The laser welding generates a planar and narrow joint area between the absorber plate and the end tubes that does not decrease to a performance of the absorber in such amount as flame or furnace brazing.

In step 140 the complete absorber is pre-cleaned mechanically and/or chemically before a coating process so that it is possible to deposit a thermal absorber coating on it.

Each of steps 120, 130, and 140 can be provided manually or automatically e.g. on a production line, where a vacuum coating line forms a part of it.

The pre-cleaned complete absorber is transferred on a conveyor of the vacuum coating line that transfers the absorber inside a chamber section of the vacuum coating line that comprises an entrance chamber, three coating chambers, and an exit chamber. The absorber firstly arrives in the entrance chamber, wherein a vacuum is pumped and the absorber is further cleaned by plasma ion cleaning. Then, a hatch that isolates the entrance chamber from other part of the chamber section is opened and the further cleaned absorber is conveyed from the entrance chamber into a first coating chamber.

In step 150 is deposited by means of the vacuum coating line a first coating layer configured to absorb light on the complete absorber by using a physical vapour deposition and/or a plasma-enhanced chemical vapour deposition.

The first coating layer, which layer thickness is 10 nm-600 nm, comprises titanium, aluminium, silicon, and nitrogen ($Ti_xAl_ySi_z)N_a$ and it is deposited in vacuum e.g. by magnetron sputtering from a substrate with a composition similar to the composition of the layer to be deposited or by simultaneous sputtering from three pure element targets in a reactive atmosphere containing nitrogen. Alternatively, yttrium, cerium, and/or chromium can be used additionally or instead of silicon. Indices x, y, z, and a, and later on also index b indicate a stequiometric or non-stequiometric composition of a coating layer. The values of the first layer for x, y, z, and a can be e.g. 0.4, 0.5, 0.1, and 1.0 respectively. Typically, value of x is 0.3-0.5, value of y 0.3-0.6, value of z 0.03-0.2, and value of a 0.9-1.1.

If there are more layers to be deposited in step 160, the method 100 returns back to step 150, wherein the absorber having a first coating layer is conveyed into a second coating chamber, wherein a second layer, i.e. an intermediate layer, is deposited.

The intermediate layer having layer thickness between 10 nm-150 nm comprises titanium, aluminium, silicon, nitrogen, and oxygen $(Ti_xAl_ySi_z)N_aO_b$. The layer is deposited e.g. by magnetron sputtering from a target with a composition similar to the composition of the intermediate layer to be deposited or by simultaneous sputtering from two or three metallic alloy targets in a reactive atmosphere containing nitrogen and oxygen. Alternatively, yttrium, cerium, and/or chromium can be used additionally or instead of silicon. The values for x, y, z, a, and b can be e.g. 0.4, 0.5, 0.1, 0.8, and 0.3 respectively. Typically, a value of x is 0.3-0.5, value of y 0.3-0.6, value of z 0.03-0.2, value of a 0.2-0.8, and value of b 0.2-0.8.

If there is still more layers to be deposited in step 160, the method 100 returns back to step 150 and the absorber having the two coating layers is conveyed into a third coating chamber, wherein a third coating layer, i.e. a top layer, is deposited.

The thickness of the top layer is between 50 nm-250 nm and it comprises titanium, aluminium, silicon, nitrogen, and oxygen $(Ti_xAl_ySi_z)N_aO_b$, where typically a value of x is 0-0.2, value of y 0-0.2, value of z 0-1, value of a 0-2, and value of b 0-2. The top layer is deposited e.g. by magnetron sputtering from a substrate with a composition similar to the composition of the top layer to be deposited or by simultaneous sputtering from several pure element targets in a reactive atmosphere containing nitrogen and oxygen.

Naturally, the completely selectively PVD and/or PECVD coated absorber can be produced by using other layer compositions and layer thicknesses, and by depositing different number of layers than it is presented in this example. E.g., the PECVD process can be used for coating a silicon and oxide ($SiO_2$) containing top layer on the aforesaid bottom and intermediate layers.

In step 160, when the top layer has been finished and there are no layers to deposit, a hatch between the third coating chamber and the exit chamber is opened and the coated absorber is conveyed into the exit chamber. The hatch is closed for isolating the exit chamber from the coating chambers and the exit chamber is put into an ambient air pressure before the coated absorber is conveyed outside the chamber section.

In step 170, when the deposition process in the vacuum coating line has ended, the coated complete absorber is removed from the vacuum coating line and a structure of the solar thermal collector is completed by installing the coated absorber on an thermal insulator, by encapsulating the coated absorber and the insulator by means of a glass panel, an aluminium collector frame, corner pieces with venting holes, and an aluminium backing plate, and by sealing the collector.

Finally, the method 100 ends in step 180.

Alternatively, it is also possible to use so-called batch coater as a vacuum coating line in order to produce completely coated absorber, whereupon all the method steps occur in one chamber. Hence, when the method 100 is in step 160 and there are still one or more layers to be deposited, the method 100 returns back to step 150, where next layer is deposited on the absorber in the same single chamber. Thus, in the case of the batch coater, there is no need to convey the absorber inside the batch-coater and outside the batch-coater respectively.

Figure 2A:
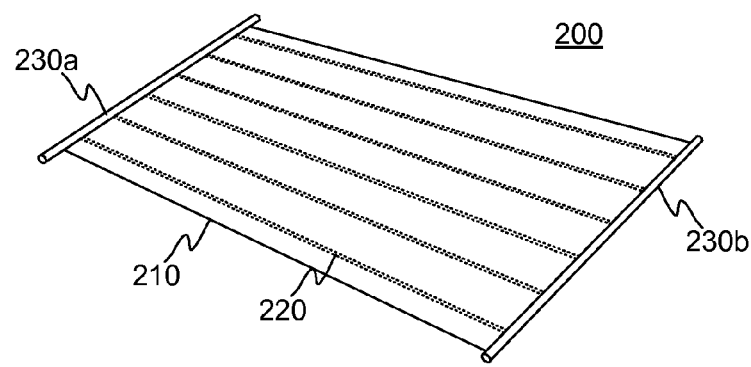
FIGS. 2a-2c illustrate a schematic view of a direct flow absorber, a close-up of a laser welded joint area, and a cross-section of a coating.

FIG. 2a illustrates a complete full aluminium direct flow absorber 200 for a solar thermal collector. The absorber 200 comprises an absorber plate 210, where is one or more integrated heat transport tubes 220 for a heat transport fluid. The absorber plate 210 is formed from a single aluminium piece or it is produced by attaching aluminium strips together.

At the ends of the absorber plate 210 are connected by means of laser welding end tubes 230a, 230b so that the end tubes 230a, 230b and the integrated heat transport tubes 220 form a continuous heat transport channel, e.g. for water, in the absorber 200.

Figure 2B:
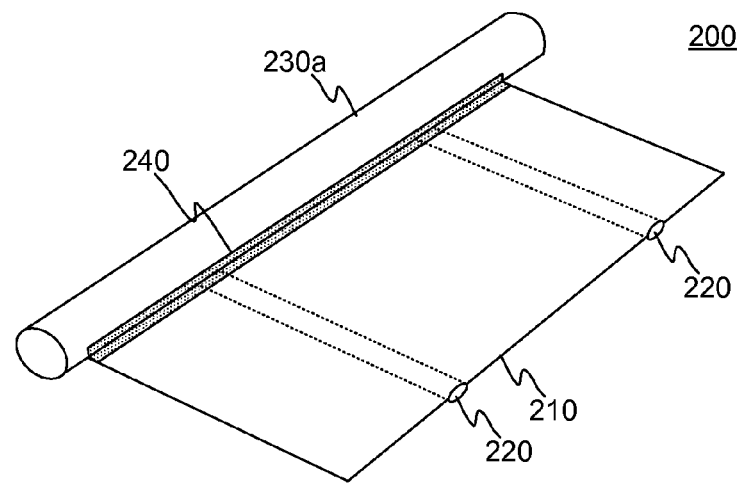

FIG. 2b illustrates a close-up of a joint area 240 of the absorber plate 210 and one end tube 230a that is extremely planar and narrow when comparing it with e.g. robust, large, and dirty flame brazing joints that have to mechanically clean before the deposition process.

Figure 2C:

FIG. 2c illustrates a cross-section of a multilayer optical coating structure 250 of a complete direct flow aluminium absorber 200, where are prepared water channels 220 inside the absorber plate 210.

On a surface of the absorber plate 210 as well as the end tubes 230a, 230b is deposited by means of a PVD and/or a PECVD on a vacuum coating line the coating structure 250, which comprises a layer 252 that is firstly deposited directly on the surface of the absorber plate 210 in order to absorb light and hinder a diffusion of elements from the absorber 200 towards the coating 250 and from an environment towards the absorber 200. An intermediate layer 254 is deposited on the layer 252 for absorbing partially an incident light and enhancing interference at selected wavelengths. A top layer 256 in the coating 250 is provided on the intermediate layer 254 in order to isolate partially the coating 250 from the environmental gases and serve as an antireflection layer. It is also possible to design the absorber 200 so that it is the layer 254 that prevents the corrosion of the absorber 200 or, alternatively, the thermal absorber 200 can be designed so that the top layer 256 provides the prevention of the corrosion of the absorber 200.

The first layer 252 can have e.g. composition comprising titanium, aluminium, nitrogen, and one of following elements: silicon, yttrium, cerium, and chromium. The intermediate second layer 254 can have e.g. composition comprising titanium, aluminium, nitrogen, oxygen, and one of following elements: silicon, yttrium, cerium, and chromium. The top layer 256 can comprise e.g. titanium, aluminium, silicon, nitrogen, and oxygen.

Figure 3:
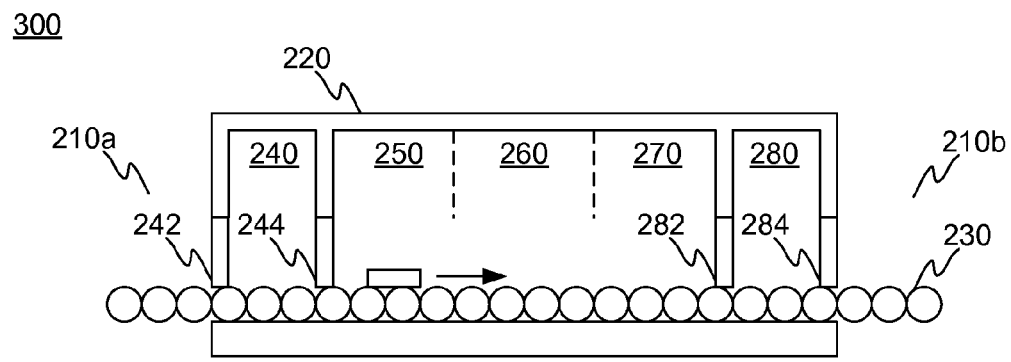
FIG. 3 illustrates a cross-section of a vacuum coating line that is used for coating a complete direct flow absorber.

FIG. 3 illustrates a vacuum coating line 300, where conveyor sections 310a, 310b and a chamber section 320 comprise a conveyor 330, i.e. a roller conveyor, which is adapted to transfer a complete absorber through the line 300. The conveyor 330 can also be a conveyor belt and both cases the whole line 300 is designed so that several absorbers can be in line on the conveyor 330 and inside the chamber section 320. A number of absorbers in line depend on sizes of the absorbers.

The chamber section 320 comprises an entrance chamber 340 having hatches 342, 344, where a vacuum is pumped and the absorber is cleaned by plasma ion cleaning, a first coating chamber 350 having a first magnetron configured to execute magnetron sputtering, a second coating chamber 360 having a second magnetron configured to execute another magnetron sputtering, and a third coating chamber 370 configured to execute a chemical vapour deposition process. There is no hatches between the coating chambers 350, 360, 370, but it is also possible that the coating chambers 350, 360, 370 are separated from each other by additional hatches. At the end of the chamber section 320 locates an exit chamber 380 comprising hatches 382, 384, where the absorber is returned to an ambient air pressure.

Inside the coating chambers 350, 360, 370 is a vacuum continuously when the vacuum coating line is switched on, but when the absorber is conveyed from the entrance chamber 340 to the first coating chamber 350, the hatches 342, 344 are closed and the entrance chamber 340 is returned to the ambient air pressure for receiving new absorber to be coated. The same concerns the exit chamber 380 so that when the coated absorber is conveyed from the exit chamber 380 outside the chamber section 320, the hatches 382, 384 are closed and the exit chamber 380 is pumped in vacuum for receiving next coated absorber.

A control unit (not shown) manages the vacuum coating line 300 by means of information provided by sensors installed in the line 300, a computer program run by at least one processor of the control unit, and/or instructions provided by a user through an user interface (not shown) of the line 300. The control unit controls e.g. at least the roller conveyor 330, entrance chamber 340, coating chambers 350, 360, 370, and exit chamber 380. In order to maximize an efficiency of the line 300, the control unit can control the roller conveyor 330 and the chamber section 320 so that one absorber or line of absorbers is inside the entrance chamber 340, one absorber or line of absorbers is in one of the coating chambers 350, 360, 370, and one absorber or line of absorbers is inside the exit chamber 380 at the same time.

Figure 4:
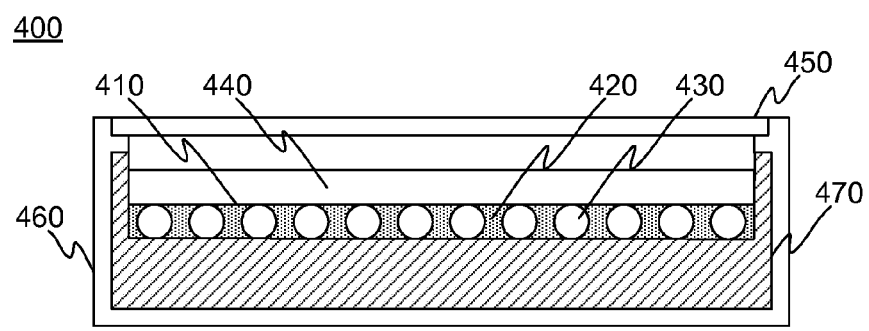
FIG. 4 illustrates a cross-section of a solar thermal collector.

FIG. 4 illustrates a cross-section of a flat plate solar thermal collector 400 capable of absorbing solar radiation.

The flat plate collector 400 comprises a full aluminium direct flow absorber 410 having an absorber plate 420 with integrated heat transport tubes 430 for a heat transport fluid. The absorber plate 420 is formed from a single aluminium piece or it is produced by attaching aluminium strips together. The cross-section illustrates clearly an aluminium multi port extrusion extruded (MPE) profile, i.e. the microchannel tubes 430, of the absorber plate 420 that is configured to efficient heat transfer.

The absorber 410 has also end tubes (not shown) for a heat transport fluid that are connected to the ends of the absorber plate 420 by laser welding so that the end tubes and the integrated heat transport tubes 430 form a continuous heat transport channel inside the absorber 410.

On a surface of the complete absorber 410, i.e. on the absorber plate 420 and the end tubes, is deposited by means of a PVD and/or a PECVD on a vacuum coating line a coating 440, which comprises a first layer that is deposited directly on the surface of the absorber plate 420 in order to absorb light and hinder a diffusion of elements from the absorber 410 towards the coating 440 and from an environment towards the absorber 410. An intermediate second layer is deposited on the first layer for absorbing partially an incident light and enhancing interference at selected wavelengths. A top layer in the coating 440 is provided on the intermediate layer in order to isolate partially the coating 440 from the environmental gases and serve as an antireflection layer. It is also possible to design the absorber 410 so that it is the second layer that prevents the corrosion of the absorber 410 or, alternatively, the absorber 410 can be designed so that the top layer provides the prevention of the corrosion.

The first bottom layer has e.g. composition comprising titanium, aluminium, nitrogen, and one of following elements: silicon, yttrium, cerium, and chromium. The intermediate second layer can have e.g. composition comprising titanium, aluminium, nitrogen, oxygen, and one of following elements: silicon, yttrium, cerium, and chromium. The top third layer can comprise e.g. titanium, aluminium, silicon, nitrogen, and oxygen.

The flat plate collector 400 has a transparent cover 450, e.g. a highly transparent glass or polycarbonate cover, which allows the solar radiation to pass to the absorber 410 and reduces heat loss from it. In addition, the flat plate collector 400 comprises e.g. a corrosion resistant anodized aluminium collector frame 460 including an backing plate that together with the cover 450 and shock and temperature resistant corner pieces with venting holes (made from e.g. Gore-Tex membrane, not shown) shelters the absorber 410, the heat transport tubes 430, and end tubes connected to the absorber 410. The cover 450 and the collector frame 460 seal the collector 400 by means of a high temperature and ultraviolet resistant glue, and a rubber seal (not shown) for preventing any external water penetration into the collector 400. A heat transport fluid, e.g. air, water, or antifreeze, flows in the tubes 430 and the end tubes so that absorbed heat can be removed from the absorber 410. The heat transport fluid circulates through the tubes 430 and the end tubes transporting the resulted heat to e.g. a water tank directly in the case of water flowing in the tubes 430 and the end tubes. On the bottom of the collector 400 and against the collector frame 460 is yet heat insulation 470, which comprises e.g. 20-50 mm mineral wool.

The invention has been now explained above with reference to the aforesaid embodiments and the several advantages of the invention have been demonstrated. It is clear that the invention is not only restricted to these embodiments, but comprises all possible embodiments within the spirit and scope of the invention thought and the following claims.

The invention claimed is:

1. A method (100) for producing a direct flow aluminum absorber (200) for a solar thermal collector (400), the absorber comprising
   an absorber plate (210),
   at least one integrated tube (220) inside the absorber plate for a heat transport fluid, and
   at least one end tube (230a, 230b) for a heat transport fluid, which is connected to the absorber plate, wherein the method comprises
   laser welding (130) the at least one end tube to the absorber plate so that the at least one end tube and the at least one integrated tube form a continuous heat transport channel into a complete absorber (200), and
   depositing (150) on the complete absorber at least one layer (250, 252, 254, 256) configured to absorb light, wherein the at least one layer is deposited after the laser welding step.

2. The method of claim 1, wherein the absorber plate is produced (120) by a single aluminum piece or by attaching aluminum strips together, the produced absorber plate comprising at least one integrated heat transport tube for the heat transport fluid.

3. The method of claim 1, wherein the at least one layer is deposited by a physical vapour deposition and by a plasma-enhanced chemical vapour deposition on a vacuum coating line.

4. The method of claim 1, wherein three layers are deposited in a chamber section of the vacuum coating line, a first layer of the three layers on the complete absorber has composition comprising titanium, aluminum, nitrogen, and one of following elements: silicon, yttrium, cerium, and chromium; a second layer on the first layer has composition comprising titanium, aluminum, nitrogen, oxygen, and one of following elements: silicon, yttrium, cerium, and chromium; and a third layer on the second layer has composition comprising titanium, aluminum, silicon, nitrogen, and oxygen.

5. A direct flow aluminum absorber (200) produced by the method of claim 1 and comprising:
   an absorber plate (210),
   at least one integrated tube (220) inside the absorber plate for a heat transport fluid, and
   at least one end tube (230a, 230b) for a heat transport fluid, which is connected to the absorber plate,
   wherein the at least one end tube is laser welded (130) to the absorber plate so that the at least one end tube and the at least one integrated tube form a continuous heat transport channel into a complete absorber (200),
   wherein at least one layer (250, 252, 254, 256) configured to absorb light is deposited (150) on the complete absorber, and
   wherein the at least one layer is deposited after the laser welding.

6. A solar thermal collector (400) comprising a direct flow aluminum absorber (200) produced by the method of claim 1 and comprising:
   an absorber plate (210),
   at least one integrated tube (220) inside the absorber plate for a heat transport fluid, and
   at least one end tube (230a, 230b) for a heat transport fluid, which is connected to the absorber plate, wherein the at least one end tube is laser welded (130) to the absorber plate so that the at least one end tube and the at least one integrated tube form a continuous heat transport channel into a complete absorber (200), wherein at least one layer (250, 252, 254, 256) configured to absorb light is deposited (150) on the complete absorber, and wherein the at least one layer is deposited after the laser welding.

7. The method of claim 1, wherein the at least one layer is deposited by a physical vapour deposition on a vacuum coating line.

8. The method of claim 1, wherein the at least one layer is deposited by a plasma-enhanced chemical vapour deposition on a vacuum coating line.

9. The method of claim 3, wherein,
in said depositing step, three layers are deposited in a chamber section of the vacuum coating line,
a first layer of the three layers on the complete absorber has composition comprising titanium, aluminum, nitrogen, and one of following elements: silicon, yttrium, cerium, and chromium;
a second layer on the first layer has composition comprising titanium, aluminum, nitrogen, oxygen, and one of following elements: silicon, yttrium, cerium, and chromium; and
a third layer on the second layer has composition comprising titanium, aluminum, silicon, nitrogen, and oxygen.

10. The method of claim 7, wherein,
in said depositing step, three layers are deposited in a chamber section of the vacuum coating line,
a first layer of the three layers on the complete absorber has composition comprising titanium, aluminum, nitrogen, and one of following elements: silicon, yttrium, cerium, and chromium;
a second layer on the first layer has composition comprising titanium, aluminum, nitrogen, oxygen, and one of following elements: silicon, yttrium, cerium, and chromium; and
a third layer on the second layer has composition comprising titanium, aluminum, silicon, nitrogen, and oxygen.

11. The method of claim 8, wherein,
in said depositing step, three layers are deposited in a chamber section of the vacuum coating line,
a first layer of the three layers on the complete absorber has composition comprising titanium, aluminum, nitrogen, and one of following elements: silicon, yttrium, cerium, and chromium;
a second layer on the first layer has composition comprising titanium, aluminum, nitrogen, oxygen, and one of following elements: silicon, yttrium, cerium, and chromium; and
a third layer on the second layer has composition comprising titanium, aluminum, silicon, nitrogen, and oxygen.

12. The method of claim 1, wherein the absorber plate is produced (120) by a single aluminum piece, the produced absorber plate comprising at least one integrated heat transport tube for the heat transport fluid.

13. The method of claim 1, wherein the absorber plate is produced (120) by attaching plural aluminum strips together, the produced absorber plate comprising at least one integrated heat transport tube for the heat transport fluid.

14. A method (100) for producing a direct flow aluminum absorber (200) for a solar thermal collector (400), the direct flow aluminum absorber comprising i) an absorber plate (210), ii) at least one integrated tube (220) inside the absorber plate for a heat transport fluid, and iii) at least one end tube (230a, 230b) for a heat transport fluid, which is connected to the absorber plate, the method comprising:
laser welding (130) the at least one end tube to the absorber plate so that the at least one end tube and the at least one integrated tube form a continuous heat transport channel into a complete direct flow aluminum absorber (200) for the solar thermal collector (400), and
after said welding step, depositing (150) on the complete absorber at least one layer (250, 252, 254, 256) configured to absorb light by at least one of the group consisting of physical vapour deposition and plasma-enhanced chemical vapour deposition on a vacuum coating line.

15. The method of claim 14, wherein the at least one layer is deposited by physical vapour deposition on the vacuum coating line.

16. The method of claim 14, wherein the at least one layer is deposited by plasma-enhanced chemical vapour deposition on the vacuum coating line.

17. The method of claim 14, wherein the at least one layer is deposited by physical vapour deposition and by plasma-enhanced chemical vapour deposition on the vacuum coating line.

18. The method of claim 14, wherein,
in said depositing step, three layers are deposited in a chamber section of the vacuum coating line,
a first layer of the three layers on the complete absorber has composition comprising titanium, aluminum, nitrogen, and one of following elements: silicon, yttrium, cerium, and chromium;
a second layer on the first layer has composition comprising titanium, aluminum, nitrogen, oxygen, and one of following elements: silicon, yttrium, cerium, and chromium; and
a third layer on the second layer has composition comprising titanium, aluminum, silicon, nitrogen, and oxygen.

* * * * *